United States Patent [19]

Golke et al.

[11] Patent Number: 4,471,628
[45] Date of Patent: Sep. 18, 1984

[54] PROCEDURE FOR COOLING OF WORK PIECES

[75] Inventors: Heinz Golke, Breitscheid; Wolfgang Volker, Tonisvorst; Andreas Donnerhack, Krefeld, all of Fed. Rep. of Germany

[73] Assignee: Messer Griesheim GmbH, Frankfurt, Fed. Rep. of Germany

[21] Appl. No.: 417,054

[22] Filed: Sep. 13, 1982

[30] Foreign Application Priority Data

Dec. 5, 1981 [DE] Fed. Rep. of Germany ....... 3148275

[51] Int. Cl.³ .......................................... F25D 17/02
[52] U.S. Cl. ......................................... 62/64; 62/48; 62/57; 252/67; 252/70; 252/71
[58] Field of Search ................. 62/48, 64, 57; 252/67, 252/70, 71

[56] References Cited

U.S. PATENT DOCUMENTS

| | | | |
|---|---|---|---|
| 1,901,446 | 3/1933 | Heylandt | 62/48 |
| 2,690,051 | 9/1954 | Pekin | 252/71 |
| 3,393,152 | 7/1968 | Smith et al. | 252/67 |
| 4,093,553 | 6/1978 | Galey et al. | 252/70 |
| 4,181,522 | 1/1980 | Galey et al. | 252/70 |
| 4,341,078 | 7/1982 | Weitzen | 62/48 |

Primary Examiner—Ronald C. Capossela
Attorney, Agent, or Firm—Connolly and Hutz

[57] ABSTRACT

A procedure for cooling work pieces includes mixing solid matter in the form of microscopic particles with a low boiling liquefied gas wherein the particles are suspended therein due to their specific weight or by the turbulence in the gas.

6 Claims, 4 Drawing Figures

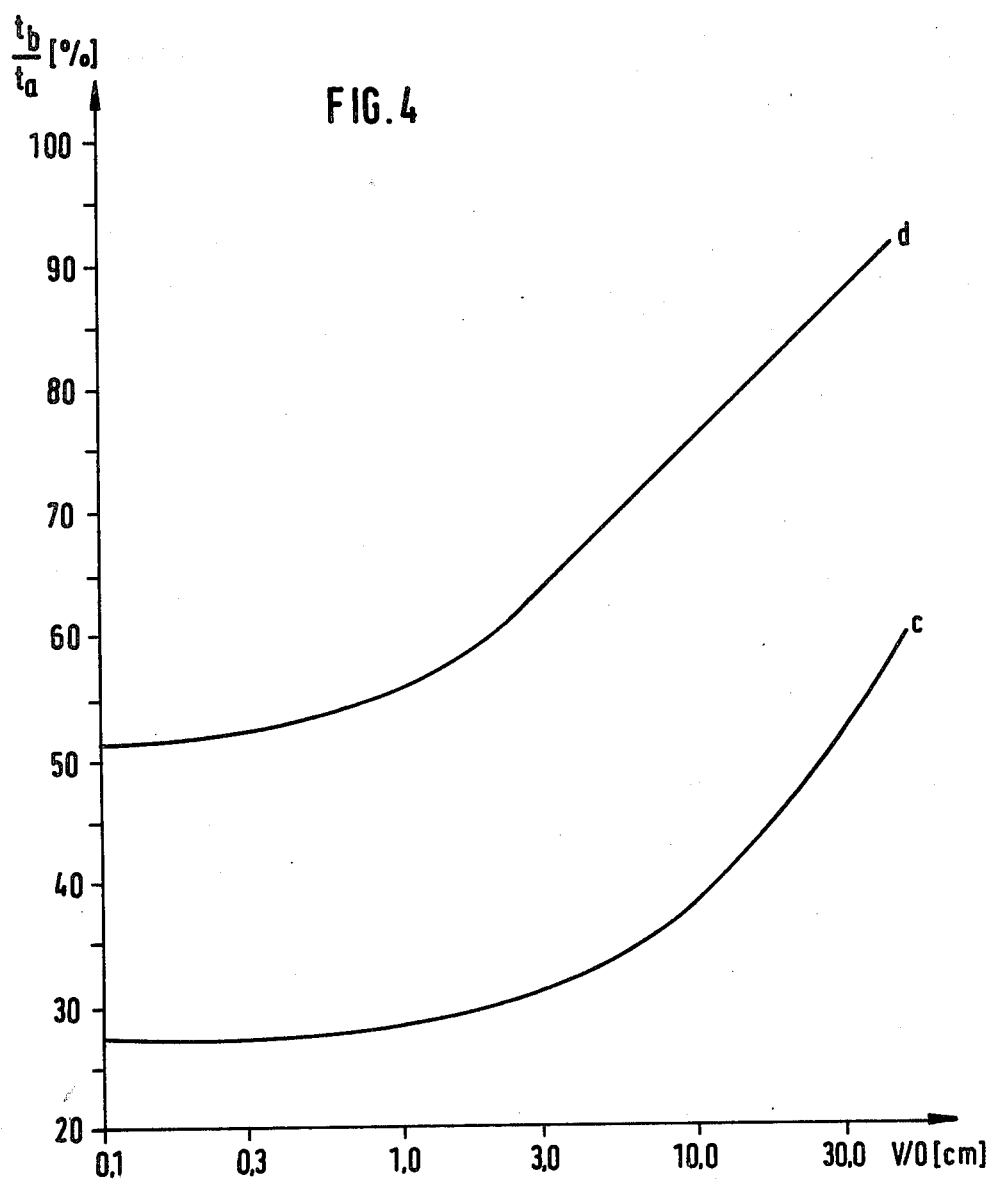

PROCEDURE FOR COOLING OF WORK PIECES

BACKGROUND OF INVENTION

The invention concerns a procedure for cooling work pieces by direct heat exchange with a low-boiling liquefied gas.

In industrial practice, work pieces, particularly work pieces of metal, are frequently cooled by means of direct heat exchange with liquid nitrogen. The low coolant temperature of −196° C. guarantees relatively short cooling time in addition to the low end temperature. Examples of this are cold shrinking and pipe frosting. In pipe frosting, the liquid in a pipe is temporarily frozen at one or two locations, i.e., the pipeline is closed, so that repairs can be made on the pipeline.

In the case of small work pieces, the cooling times proper constitute no significant economical factor, since, for instance in cold shrinking, the further processing of the cooled parts limits the production process in time, or, as another example, in pipe frosting, the period when the cold has to be maintained is significantly longer than the duration of the cooling process. However, if the work pieces are larger, the cooling duration increases overproportionally to the volume of the work piece. This is partially unavoidable since the heat conductivity in the interior of the work piece cannot be influenced. An acceleration of the cooling can at most be achieved by means of improved heat transfer between the surface of the work piece and the low-boiling liquefied gas.

SUMMARY OF INVENTION

The object of the invention is therefore to decrease the cooling time by improving the heat transfer between the surface of the work piece and the low-boiling liquefied gas by means of a procedure for cooling work pieces by means of direct heat exchange with a low-boiling liquefied gas.

According to the invention this is achieved thereby that solid matter in the form of microscopic particles are mixed with the low-boiling liquefied gas, which particles due to their specific weight are suspended in the liquefied gas or at least are kept in suspension by the turbulence in the boiling gas.

When nitrogen is used as coolant, silica gel has proven the most suitable solid matter for admixture.

The invention is based on the principle that the heat transfer between the surface of the work piece and the low-boiling liquefied gas can be improved, if the gas film forming between work piece and liquid by Leydenfrost's phenomenon can be disturbed. This disturbance is achieved by the admixture according to the invention of solid matter in the form of microscopic particles. This facilitates the access of the nitrogen to the surface of the work piece, and the work piece is more rapidly cooled. When the gas film is undisturbed, the heat transfer value corresponds merely to that of the combination of the cold gas/work piece (film boiling). When the gas film is disturbed according to the invention, the heat transfer value is greater and approaches the combination liquid gas/work piece (bubble boiling).

The specific weight of the particles to be admixed should be such that the particles either are suspended in the liquefied gas or at least are mainly kept suspended by the turbulence in the boiling gas and do not sediment. This guarantees that the desired effect is activated over the entire surface of the work piece. In addition, the particles must be chemically inert in relation to the materials to be cooled.

In practice, it has been found that 2–7% by weight solid particles are sufficient to generate the desired effect. Fine dusts, e.g., of synthetic materials, are suitable as solid particles. Materials with a $SiO_2$ basis (pure sea sand, perlite and silica gel) as well as dry ice ($CO_2$) have proven most suitable for use with liquid nitrogen, the most common coolant. The best results were obtained with a silica gel known commercially by the name Aerosil 200. In all cases, the admixture of these materials to liquid nitrogen caused an increase of the heat transfer value as compared to cooling with pure liquid nitrogen.

A dependence of this increase on such parameters as particle size or specific surface could not be experimentally determined. However, it can be assumed that a high specific surface within a specific size range would have a positive influence on the effect.

THE DRAWINGS

FIG. 4 illustrates the decrease of the cooling times for cylindrical bodies of various dimensions by means of a mixture of Aerosil and liquid nitrogen.

DETAILED DESCRIPTION

Figure 1:
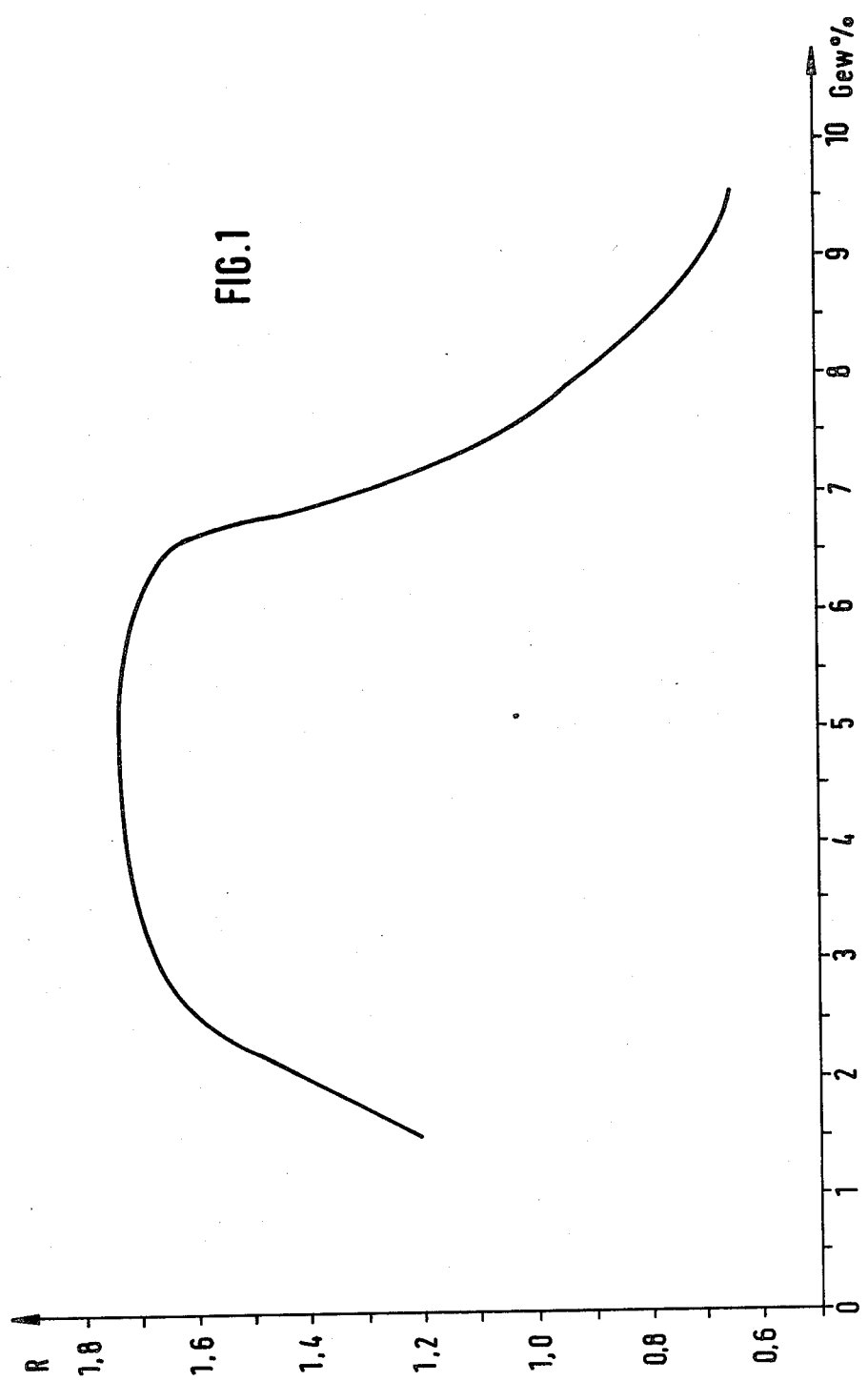
FIG. 1 illustrates the increase of the evaporation rate of liquid nitrogen by addition of Aerosil 200 in various concentrations.

FIG. 1 shows the specific evaporation rate R as a ratio of the evaporation rates of liquid nitrogen with an admixture of Aerosil 200 to liquid nitrogen without admixture depending on the content of Aerosil 200 in % by weight in the admixture. It is found that the maximum evaporation rate is achieved in the range between 3 and 6 % by weight Aerosil. It is higher than that of liquid nitrogen without additive by a factor of 1.7.

Figure 2:
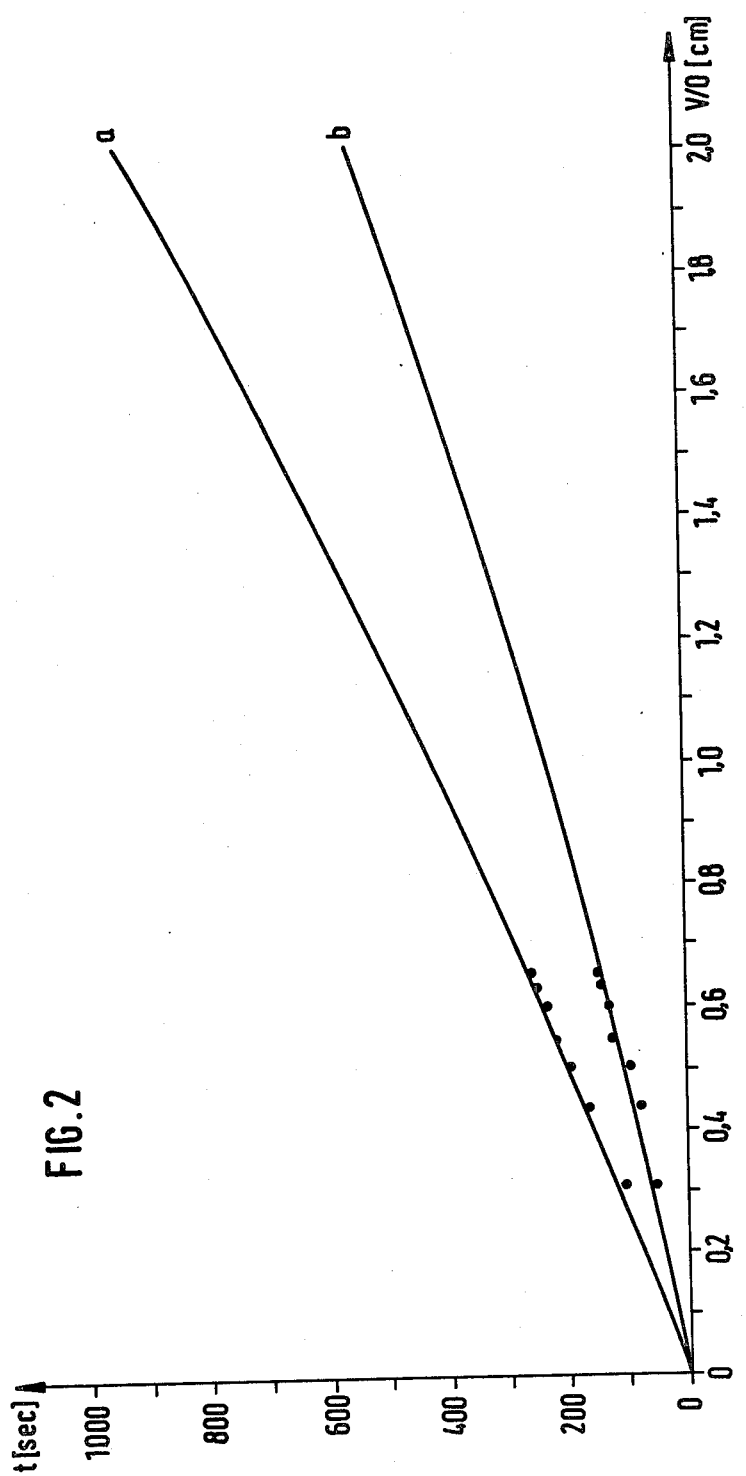
FIG. 2 illustrates the measured and calculated cooling times for work pieces of VA-steel in various dimensions.
Figure 3:
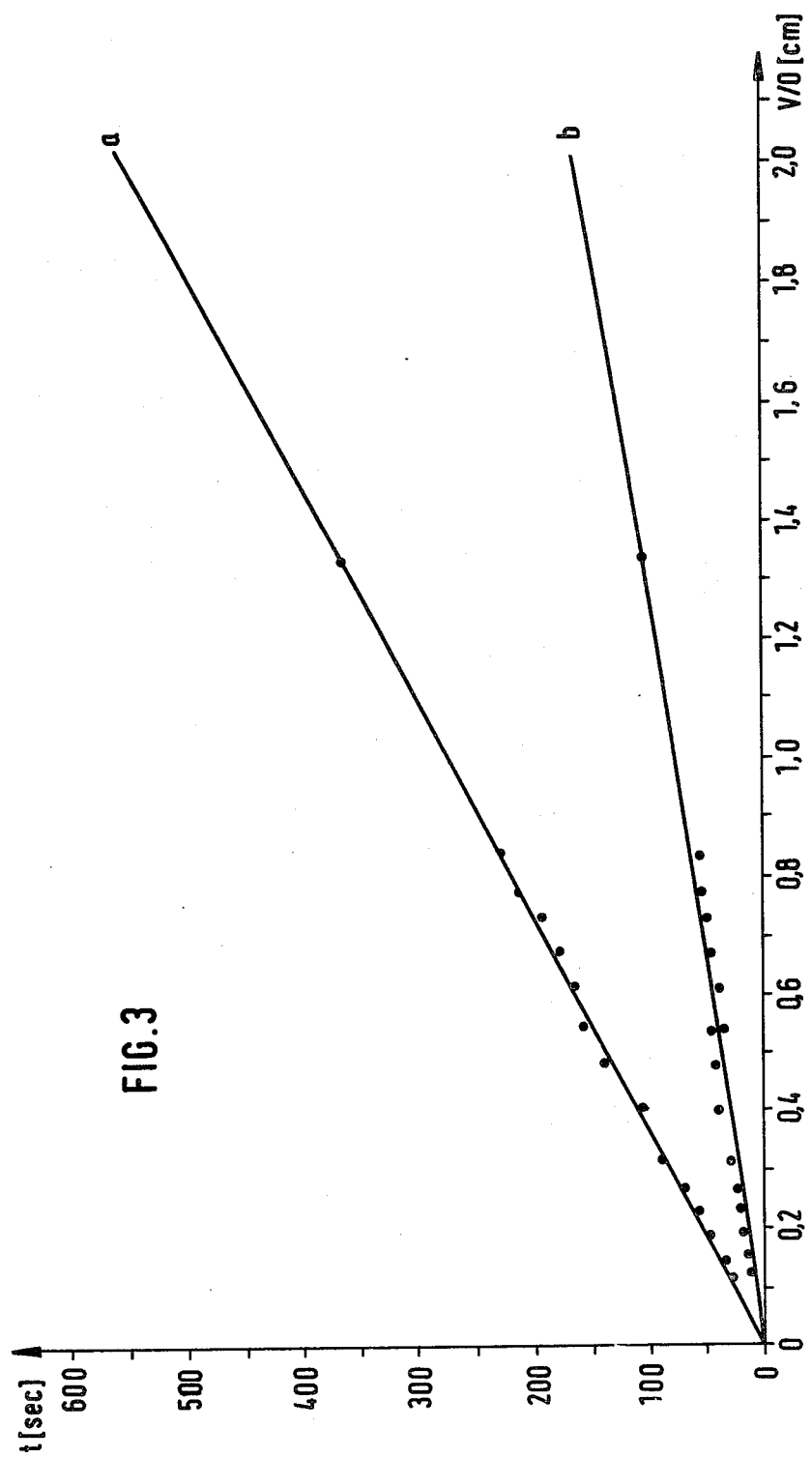
FIG. 3 illustrates the measured and calculated cooling times for aluminum parts of various dimensions.

This effect is also confirmed by the results shown in FIGS. 2 and 3 from timed cooling tests. FIG. 2 shows the dependence of cooling times for bodies of VA steel on the dimensions of the bodies. The ratio V/S (volume/surface) was entered as characteristic for the dimension of the bodies, since both the experiment and the calculation show a far-reaching proportionality of this magnitude with the cooling time t. The curve a supplies the calculated values for the cooling times in liquid nitrogen, the curve b the calculated values for the cooling times in liquid nitrogen with 5% by weight addition of Aerosil 200. The dots indicate the values found in the experiments.

The time between the beginning of the cooling process and the end of the boiling process (recognizable from sudden decrease in the gas development) was entered as cooling time.

Both the test results and the model calculations yield an average heat transfer figure of 350 kcal/$m^2$h for the cooling with liquid nitrogen. When the same parts are cooled in liquid nitrogen with Aerosil additive, however, the cooling times of approximately 0.51 of those without Aerosil additive. This corresponds to a heat transfer value of about 700 kcal/$m^2$h.

Measurements on larger parts, e.g., bodies of 9.3 kg VA steel correspond well with the calculated extrapolation of the curve for higher V/S values. The relative cooling duration is slightly higher, 0.59.

There is a certain inaccuracy in the time measurements in FIG. 2 for large parts of VA steel, since the gas development at the end of the boiling process does not stop suddenly but decreases gradually.

The diagram in FIG. 3 corresponds to that of FIG. 2 in all respects and shows the cooling conditions for bodies of aluminum. The resulting heat transfer values are 350 kcal/m$^2$h and 1300 kcal/m$^2$h, respectively. This value is confirmed for larger parts as well, e.g., 1.32 kg aluminum.

On the basis of the heat transfer values calculated in this manner, the time requirement for cooling of larger parts can also be extrapolated, as shown in FIG. 4. This figure represents the ratio of the cooling times $t_b/t_a$ with and without Aerosil additive over the ratio of volume to surface. Curve c gives the values for aluminum, curve d the values for VA steel. The relative time saving decreases with increasing size of the work piece, since the limited heat coductivity in the interior of the body limits the temperature equalization in the material itself in spite of the improved heat transfer at the surface. In any case, the cooling time is significantly reduced for work pieces of commonly occuring size.

The mixture of liquid nitrogen and Aerosil 200 adheres slightly to metal surfaces so that there may be a potentially disturbing residue of solid matter after the cooling. However, this residue can easily be rinsed off with liquid nitrogen, so that there will be no problems in subsequent manufacturing steps. Occasionally, a powdery coating of solid matter may even be desirable, e.g., to improve the sliding ability of the work pieces. In several such cases, a synthetic material dust is suitable as solid matter additive to the liquid nitrogen.

SUMMARY

In industrial practice, work pieces, particulary work pieces of metal, are frequently cooled by means of direct heat exchange with liquid nitrogen, for example, in the cases of cold shrinking or pipe frosting. Hereby, a gas film is developed between the surface of the work piece and the liquid nitrogen and reduces the heat transfer value. Thereby, the cooling time is significantly increased, particularly for work pieces of average size.

In order to reduce the cooling time, a solid substance in the form of microscopic particles is added to the low-boiling liquefied gas, which solid substance is suspended in the liquid due to its specific weight. The solid substance particles disturb the gas film and facilitate the contact between the liquid and the work piece, which thus cools more rapidly. Silica gel is eminently suitable as solid substance additive to liquid nitrogen.

What is claimed is:

1. In a procedure for cooling of work pieces by means of direct heat exchange with a low-boiling liquefied gas, characterized thereby, mixing solid matter in the form of microscopic particles which do not volatilize with the low-boiling liquefied gas, and suspending the particles in the liquefied gas with the solid matter functioning to disturb the gas film between the work piece and liquid to maximize heat transfer and wherein the cooling of the work pieces is at ambient temperatures, and a coating of the solid matter is formed on the work piece after the cooling process.

2. Procedure according to claim 1, characterized thereby, that the particles are suspended due to their specific weight.

3. Procedure according to claim 1, characterized thereby, that the particles are suspended by the turbulence in the boiling gas.

4. Procedure according to claim 3, characterized thereby, that the particles are also suspended due to their specific weight.

5. Procedure according to claim 1, characterized thereby, that silica gel is mixed to nitrogen used as low-boiling liquefied gas.

6. Procedure according to claim 5, characterized thereby, that the solid matter content is from 3% to 6% of the mixture.

* * * * *